UNITED STATES PATENT OFFICE.

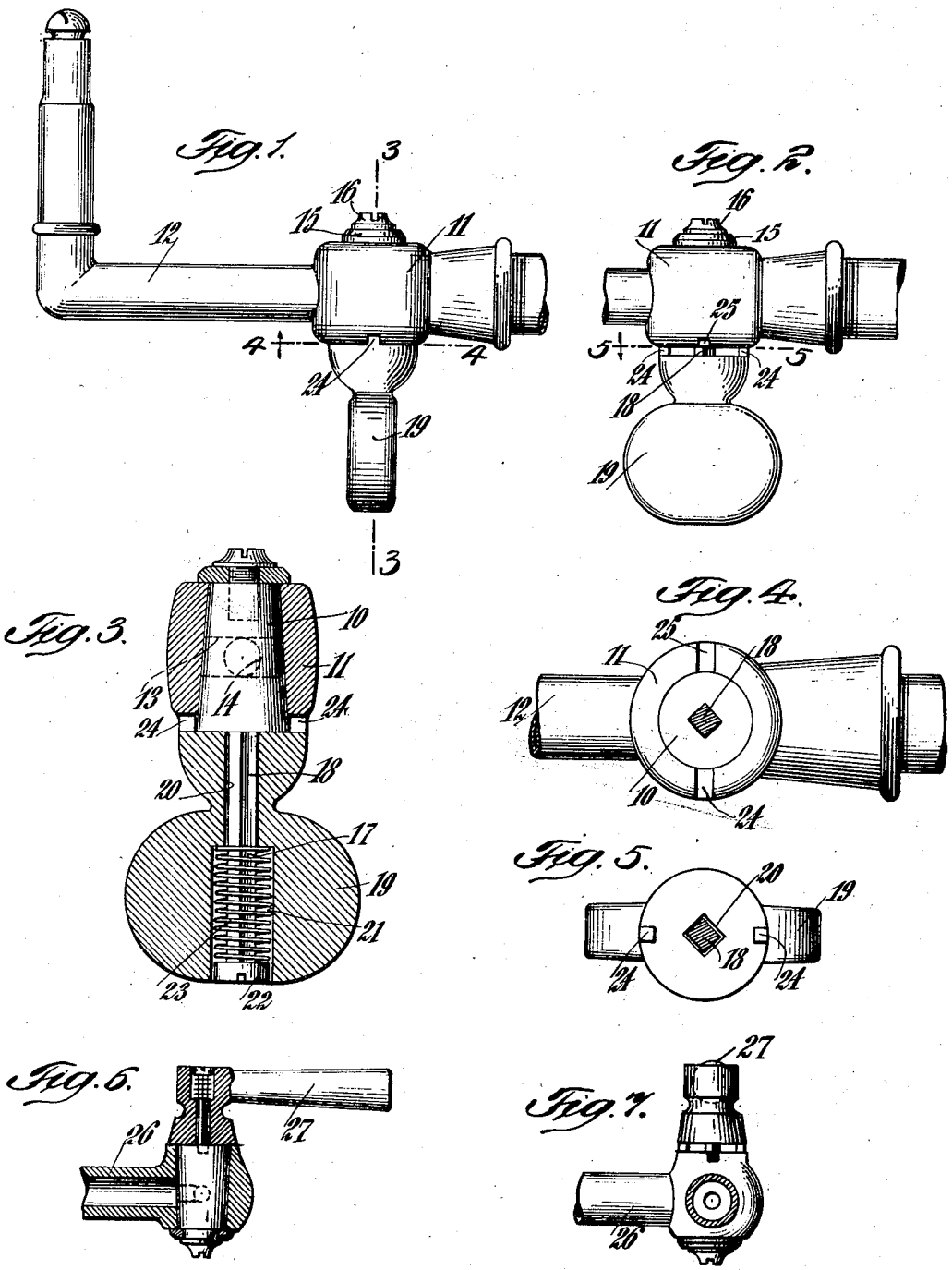

FRED WANGELIN, OF BROOKLYN, NEW YORK.

GAS-COCK.

1,174,456. Specification of Letters Patent. Patented Mar. 7, 1916.

Application filed July 21, 1915. Serial No. 41,049.

*To all whom it may concern:*

Be it known that I, FRED WANGELIN, a citizen of the United States, and a resident of the borough of Brooklyn, in the county of Kings and State of New York, have invented certain new and useful Improvements in Gas-Cocks, of which the following is a specification.

This invention relates to safety gas-cocks which when closed are locked against accidental turning.

The object of the invention is to provide a cock of this character which has the apparent simplicity of an ordinary gas-cock, avoiding complexity of construction and unsightly projections.

In the drawings, Figure 1 is a side elevation of a gas fixture showing my improved gas cock incorporated therein and in closed position; Fig. 2 is a side elevation thereof in open position; Fig. 3 is a sectional view of my invention on the line 3—3 of Fig. 1; Fig. 4 is a sectional view on the line 4—4 of Fig. 1, looking up; Fig. 5 is a sectional view on the line 5—5 of Fig. 2, looking down; Fig. 6 shows the same in section as used in connection with the burner of a gas stove; and Fig. 7 is a side view thereof.

Similar reference characters indicate corresponding parts throughout the several views.

The gas-cock herein shown to illustrate the invention comprises a valve casing 11 disposed in a gas pipe or bracket 12. This valve casing has on its interior a conical valve seat and holes 14 opening from said pipe through said seat. The casing is provided adjacent the larger end of said valve seat with a notch or notches 25. A conical valve 10 is disposed in said casing 11 fitting the seat thereof. This valve is provided with a transverse hole 13 adapted to register with the holes 14 in said casing. This conical valve has a screw-threaded socket at its small end and an elongated angular stem 18 projecting from its large end. This stem has at its outer end an enlargement 22. A washer 15 rests on one end of the valve casing 11 and a screw 16 passes through said washer and takes into the socket at the small end of the valve 10. A key 19 has an angular passage 20 which engages the angular stem 18 and an enlarged recess 21 in its outer portion in alinement with said angular passage. The key is provided at its inner end with a lug or lugs 24 which engage the notches 25 when the key is turned off. An expansive spring 23 is disposed in the recess 21 between the inner end thereof and the enlargement 22 at the outer end of the valve stem and tends to hold the key in contact with the notched end of the valve casing and to force the lugs 24 into engagement with the notches 25 when the cock is turned off, thereby locking the cock in closed position.

When it is desired to turn on the gas, the key 19 is drawn downwardly against the pressure of the spring 23 until the projections 24 are entirely free of the notches 25, whereupon the valve may be turned into open position. When the valve is to be closed, the stem is turned until the projections move into the notches 25 by force of the spring 17, whereupon further movement of the valve is prevented.

In Figs. 6 and 7, I have shown my invention as applied to a gas stove. The general construction is practically the same as in the first form of my invention, the valve, however, which is provided at the end of the gas pipe 26, being in inverted position, and the key being provided with a lever handle 27, in the usual manner.

It will be seen that in this way, any danger due to accidental opening of the valve, as with the old forms of gas cocks, is entirely prevented, and at the same time the construction has the same neat appearance of the ordinary gas cock. Under this construction the valve is held to its seat by means of the screw 16 and the washer 15 in the usual way and is not liable to become loose as might be the case if held by a spring.

I have illustrated and described a preferred and satisfactory form of my invention, but it is obvious that changes may be made therein, within the spirit and scope thereof, as defined in the appended claim.

I claim:—

A safety gas cock comprising a valve casing having a conical valve seat and a notch adjacent to the large end thereof, a conical valve turnable in said seat and having at its small end holding means engaging said valve casing at the small end of said valve seat and at its large end an elongated angular stem provided with a stop, a key having a lug adapted to engage said notch and provided with an angular passage along its inner portion engaging said angular stem and an enlarged recess in its outer portion in alinement with said angular passage, and a spring disposed in said recess between the inner end thereof and said stop, said holding means being operative to hold said valve to its seat independent of said spring and said spring being operative to automatically lock said key to said valve casing when the valve is closed and permitting a disengagement of the key from the casing for turning the valve.

In testimony that I claim the foregoing as my invention, I have signed my name in presence of two subscribing witnesses.

FRED WANGELIN.

Witnesses:
D. LEWIS MATTERN.
JOS. BISCANO.